United States Patent
Bogue

(10) Patent No.: US 7,883,760 B2
(45) Date of Patent: Feb. 8, 2011

(54) REPAIR OF COMPOSITE SANDWICH STRUCTURES WITH UNEVEN BOND SURFACES

(75) Inventor: William Bogue, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/495,870

(22) Filed: Jul. 1, 2009

(65) Prior Publication Data

US 2009/0263622 A1 Oct. 22, 2009

Related U.S. Application Data

(62) Division of application No. 11/441,866, filed on May 26, 2006, now Pat. No. 7,572,347.

(51) Int. Cl.
B32B 3/12 (2006.01)
(52) U.S. Cl. .................. 428/116; 428/118; 428/141; 428/152; 428/212; 428/409
(58) Field of Classification Search .................. None
See application file for complete search history.

(56) References Cited

U.S. PATENT DOCUMENTS

| 3,704,194 | A | 11/1972 | Harrier |
| 3,787,546 | A | 1/1974 | Pratt |
| 4,257,998 | A | 3/1981 | Diepenbrock |
| 4,668,317 | A | 5/1987 | Snyder |
| 4,777,987 | A | 10/1988 | Asagi et al. |
| 4,855,182 | A | 8/1989 | Ondrejas et al. |
| 5,252,279 | A | 10/1993 | Gore |
| 5,653,836 | A | 8/1997 | Mnich |
| 5,807,628 | A | 9/1998 | Mnich |

FOREIGN PATENT DOCUMENTS

| FR | 2773645 | 7/1999 |
| FR | 2891193 | 3/2007 |

OTHER PUBLICATIONS

Translations of FR-2773645.*
Blitzer, Tom: Honeycomb Technology: Materials, Design, Manufacturing, Applications and Testing; Hexcel Corporation 1997; pp. 193-199.
Sam Dastin, "Repairing Advanced Composite Materials," Article, Feb. 1986, pp. 86-90, vol. 58, No. 4, Machine Design, Penton Media, Cleveland, Ohio.
European Search Report Dated Sep. 7, 2007.

* cited by examiner

Primary Examiner—Ling Xu
(74) Attorney, Agent, or Firm—Carlson, Gaskey & Olds, P.C.

(57) ABSTRACT

A method of restoring a section of a component having a honeycomb bonded to a skin includes the steps of separating a first honeycomb from the skin, wherein the honeycomb includes an uneven surface. At least a portion of the uneven surface is removed to form a bonding surface on the skin. A conformable layer is bonded to the uneven surface. Then a replacement honeycomb is then bonded to the conformable layer.

12 Claims, 2 Drawing Sheets

REPAIR OF COMPOSITE SANDWICH STRUCTURES WITH UNEVEN BOND SURFACES

RELATED APPLICATIONS

This application is a divisional of U.S. patent application Ser. No. 11/441,866, which was filed May 26, 2006, now U.S. Pat. No. 7,572,347.

BACKGROUND OF THE INVENTION

This invention relates to composite materials and, more particularly, to repairing composite sandwich structures.

Composite structures are commonly known and used in, for example, gas turbine engines for aerodynamic fairings. One type of composite is a sandwich structure having a face skin and a back skin that are bonded to a honeycomb core. The face skin and back skin may be laminated structures with a resin matrix, such as epoxy, with one or more plies of reinforcement fibers.

Laminated skins are fabricated in a process that involves compacting the resin filled plies of reinforcing fiber together while curing the resin. The texture of the tooling materials used on each molded face of the laminate during compaction and cure will be observed on the resulting laminate surface. If one or more of the molded faces is restrained by a non-rigid material, textures may telegraph thru the thickness of the laminate. During compaction against the ends of the honeycomb locally press into the skins and form a dimpled imprint surface.

In some instances, it is desirable to locally replace a honeycomb that has become damaged from an impact, elevated temperatures, abrasion, erosion, or other phenomenon rather than replace the entire composite structure. The honeycomb is machined to have a flat surface on both sides. The flat surfaces do not conform well with uneven surfaces without crushing the honeycomb. It is unfeasible to have the ends of the replacement honeycomb align perfectly with the dimpled imprints left by the removed honeycomb section. Traditionally, the damaged honeycomb is removed and an adhesive is applied to the laminate dimpled imprint surface to bond the skin and a replacement honeycomb together. Typically, an additional thickness of adhesive is used to "absorb" the unevenness of the dimpled imprints. However, adhesive bond strength rapidly declines as thickness increases, and structural requirements will limit the simple application of extra adhesive. Thus, there is a need for a repair method that provides improved bonding between the repair honeycomb and uneven laminates. This invention addresses those needs while avoiding the shortcomings and drawbacks of the prior art.

SUMMARY OF THE INVENTION

An example method of restoring a section of a component having a honeycomb bonded to a skin includes the steps of separating the face sheet and the original honeycomb from a skin, wherein the skin includes an uneven surface. At least a portion of the uneven bond surface is thinned to form a more even bonding surface on the laminate. A conformable is applied over the bond surface. A replacement honeycomb is then pressed into the conformable layer. The conformable layer and the adhesives are cured to restore original component structure.

An example composite component includes a sandwich structure with a honeycomb, a laminate that is bonded to each side of the honeycomb, and a repair section. The repair section includes an uneven laminate from the original component, a repair piece of honeycomb, a replacement laminate, a conformable layer, and adhesives to bond the repair section to itself and the adjacent areas.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
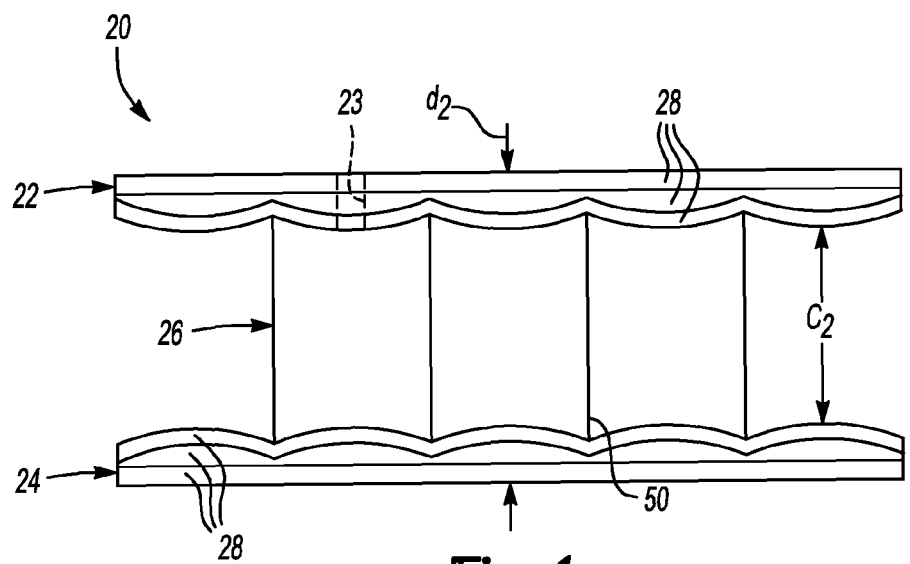
FIG. 1 illustrates an example composite structure having a damaged honeycomb core.

FIG. 1 illustrates selected portions of an example composite structure 20, such as an acoustic composite used in a fan-bypass area or nacelle of a gas turbine engine for noise attenuation. In this example, the composite structure 20 includes a face skin 22, which may include perforations 23 that extend through the thickness of the face skin. The face skin 22 and a back skin 24 are bonded to a honeycomb core 26 to provide a composite sandwich structure. In the disclosed example, each of the face skin 22 and the back skin 24 include composite layers 28, such as layers made of a resin matrix with continuous woven fiber reinforcement that are concurrently bonded to and compacted against the ends of honeycomb core 26.

Figure 4:
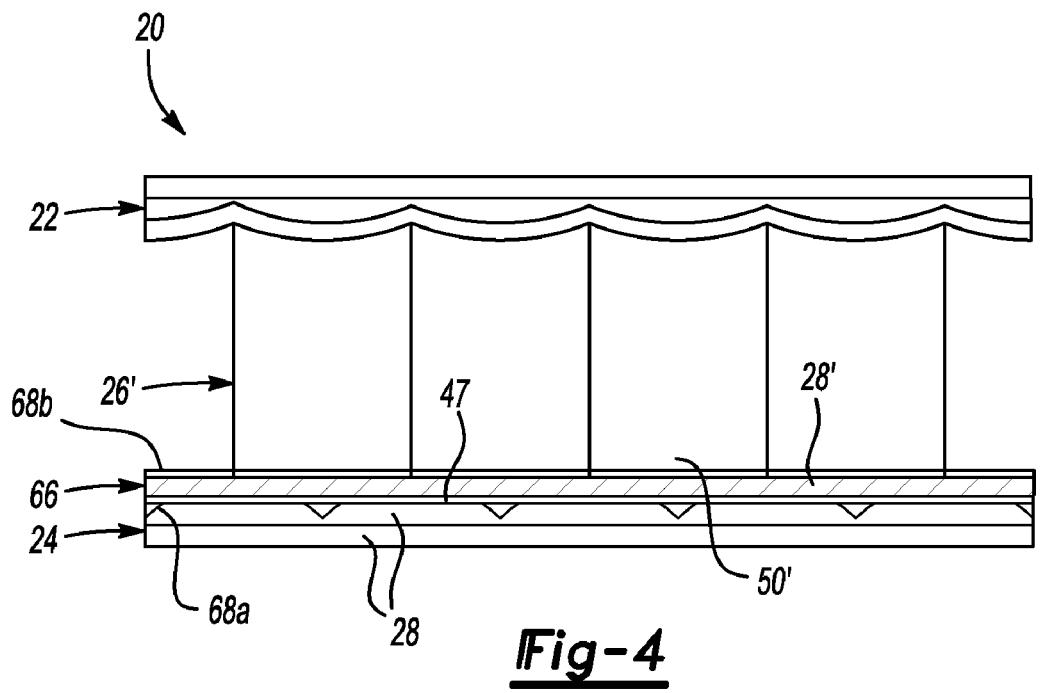
FIG. 4 illustrates a view of the composite structure with a repair material section.

In the illustrated example, the honeycomb core 26 has become damaged by, for example, an impact, elevated temperatures, abrasion, erosion, or other phenomenon. As will be described below, the composite structure 20 is repaired by removing the damaged honeycomb core 26 and replacing it with a replacement honeycomb core 26' (FIG. 4). The replacement honeycomb core 26' is bonded to the back skin 24 to provide a structurally durable repair that is dimensionally similar to the original dimensions of the composite structure 20.

Figure 2:
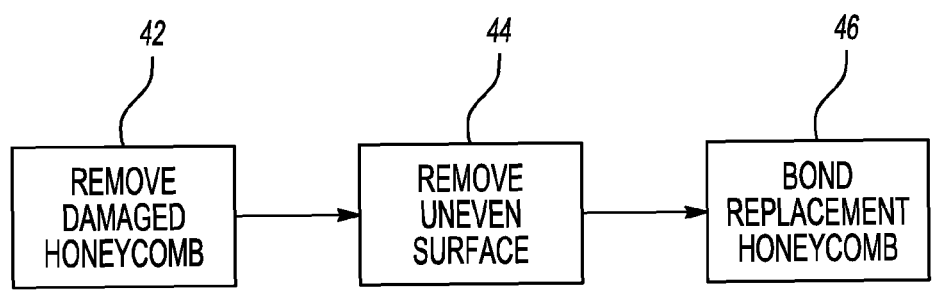
FIG. 2 illustrates an example method for repairing the composite structure of FIG. 1.

Referring to the example shown in FIG. 2, the composite structure 20 is repaired in several steps. In this example, the damaged face skin 22 and honeycomb core 26 are locally removed from the back skin 24 at step 42. Although the disclosed example describes removal from and bonding to the back skin 24, it is to be understood that the principles of the repair are also applicable to the face skin 22. Removal of the damaged honeycomb core 26 reveals an uneven surface 45 on the back skin 24 caused by the original manufacture of the back skin 24. At step 44, the uneven surface 45 is partially leveled to produce a more even bonding surface 47. At step 46, the replacement honeycomb core 26' is bonded to the bonding surface 47 of the back skin 24. As will be described below, the disclosed method provides the benefit of reducing surface variation on the back skin 24 to enable formation of a stronger bond between the replacement honeycomb core 26' and the back skin 24.

Figure 3:
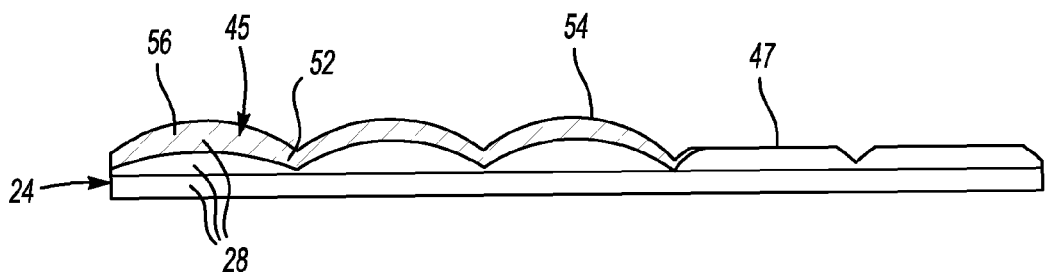
FIG. 3 illustrates a view of the composite structure after removing the damaged honeycomb core and making the bond surface less uneven.

FIG. 3 shows the back skin 24 after the removal step 42. As can be appreciated, the back skin 24 includes the uneven surface 45. In this example, the uneven surface 45 is a product of the fabrication process of the original composite structure 20. In this example, the composite structure 20 was compacted and cured in a known manner, which resulted in the uneven surface 45. During the fabrication process, ends 50 of the honeycomb core 26 press into the back skin 24 and form the dimpled imprint illustrated in FIG. 3. In this example, the dimpled imprint includes compacted (compressed/consolidated) sections 52 where the ends 50 of the honeycomb core 26 pressed into the back skin 24, and relatively uncompressed sections 54 that were between the ends 50 and therefore not compacted as much.

After the honeycomb core 26 removal step 42, a portion 56 of the uneven surface 45 is removed to produce the bonding surface 47. The portion 56 can be removed in a variety of different ways. In one example, the portion 56 is mechanically removed using a grinding, sanding, or other known mechanical process.

In the illustrated example, the back skin 24 includes three fiberglass layers 28 with a cured epoxy resin matrix. In this example, the high spots of the top composite layer 28 (i.e., the top layer in FIG. 3) are locally removed such that the middle composite layer 28 is at least partially exposed on the bonding surface 47. The removal of the portion 56 from the back skin 24 provides the benefit of reducing surface variation on the uneven surface 45. This provides a flatter surface to bond to, and thereby allows a stronger bond to be formed between the bonding surface 47 and the replacement honeycomb core 26'. In other examples, more than one composite layer 28 or less than one composite layer 28 may be removed, depending on the desired reduction in surface variation.

After removing a portion of the uneven surface 56, a conformable repair material 66 is placed onto the bonding surface 47. As illustrated in FIG. 4, a layer of adhesive 68a may optionally be used between the repair material 66 and the bonding surface 47 to strengthen the bond between the back skin 24 and the repair material 66. In this example, the repair material 66 is a composite layer 28' that is similar to or identical to the composite layers 28 used in the back skin 24, except that it is not compacted and the resin is not cured. For example, the conformable repair material 66 is made of an uncured epoxy resin matrix with continuous woven fiberglass reinforcement. Using the composite layer 28' provides the benefits of absorbing tolerance variation between the original honeycomb and repair material 66, providing additional smoothing for intimate contact with the honeycomb ends 50, restoring structural strength lost by removal of the uncompressed portions 56, and thicker regions of adhesive thickness are interrupted by the fiber reducing the strength debit due to adhesive thickness.

Optionally, another layer of adhesive 68b is used on top of the conformable repair material 66 to promote bonding between the conformable repair material 66 and the replacement honeycomb core 26'. Once the conformable repair material 66, and optionally the adhesive layers 68a and 68b, are in place, the replacement honeycomb core 26' and is pressed, against the conformable repair material 66. The face skin 22 is then installed over the replacement honeycomb 26 in a known manner In the disclosed example, compaction of the face skin 22, the replacement honeycomb core 26', and the back skin 24 occurs under pressure at an elevated temperature to cure the resin of the conformable repair material 66 and adhesive layers 68a and 68b. During compaction and curing, the ends 50' of the replacement honeycomb core 26' compress portions of the repair material 66 immediately below the ends 50', while the repair material 66 between the ends 50' is relatively uncompressed, mimicking the original sandwich structure.

Figure 5:
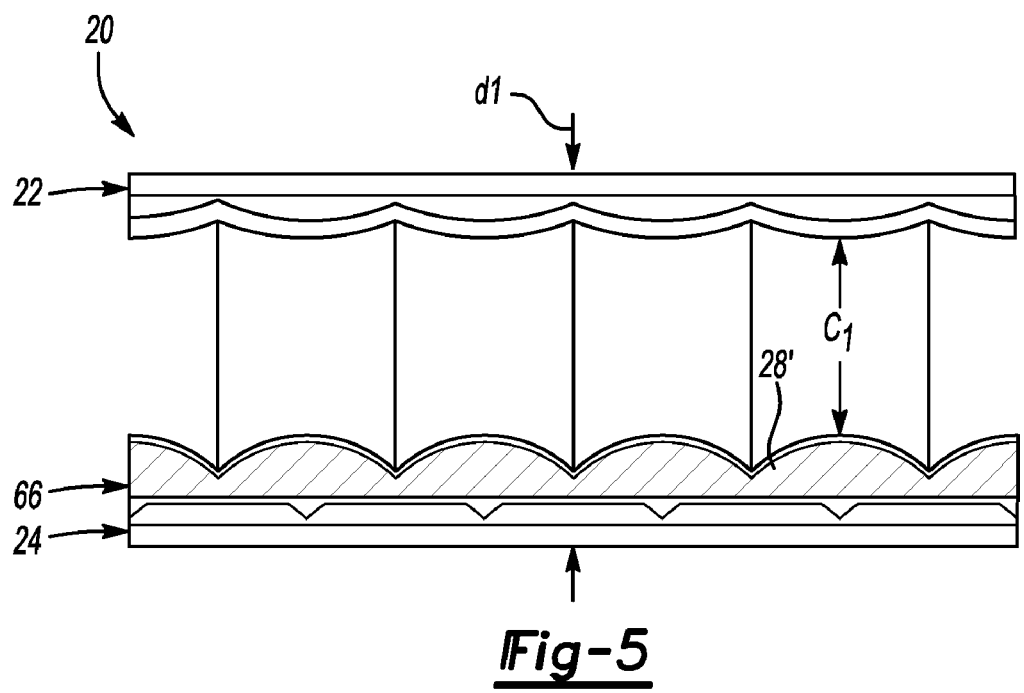
FIG. 5 illustrates the composite structure after the repair process.

FIG. 5 illustrates the composite structure 20 after the repair process. In this example, the repair material 66 is fully cured and compacted to a dimension $d_1$ that is about equal to a dimension $d_2$ (FIG. 1) and a dimension $c_1$ that is about equal to a dimension $c_2$ (FIG. 1) of the composite sandwich structure 20 before the repair (e.g., before damage to the honeycomb core 26). Thus, the disclosed example method of repair provides a structurally durable repair section that is dimensionally and functionally equal with surrounding areas of the composite sandwich structure 20 that have not been repaired.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A composite component comprising:
    a honeycomb;
    a skin bonded to the honeycomb; and
    a repair section made of a composite material having a matrix material and reinforcing fibers, wherein the repair section bonds the honeycomb and the skin together, wherein the repair section includes a compressed section and an uncompressed section.

2. The component as recited in claim 1, wherein the reinforcing fibers are continuous reinforcement fibers, and the matrix material is a resin matrix.

3. The component as recited in claim 2, wherein the repair section includes a first adhesive layer between the skin and the repair material.

4. The component as recited in claim 3, wherein the repair section includes a second adhesive layer between the honeycomb and the repair material.

5. The component as recited in claim 1, wherein the compressed section corresponds to an end of the honeycomb adjacent the skin and the uncompressed section is spaced from the end of the honeycomb.

6. The component as recited in claim 1, wherein the compressed section and the uncompressed section define an uneven surface.

7. The component as recited in claim 6, wherein a portion of the uneven surface is mechanically removed.

8. The component as recited in claim 1, wherein the skin has a top fiberglass layer, a middle fiberglass layer, and a bottom fiberglass layer, each layer with a cured epoxy resin matrix.

9. The component as recited in claim 8, wherein the top layer is adjacent the honeycomb, wherein the top layer is removed such that the middle layer is at least partially exposed to a bonding surface.

10. The component as recited in claim 1, wherein the component forms a portion of a gas turbine engine.

11. The component as recited in claim 1, wherein the compressed section and uncompressed section define a peak and a valley.

12. The component as recited in claim 1, wherein the compressed section is at a different dimension than the uncompressed section relative to the honeycomb.

* * * * *